April 8, 1958   H. FLECKENSTEIN   2,830,209
LAMINATION FOR STACKS IN ASYNCHRONOUS MACHINES
Filed Jan. 3, 1956
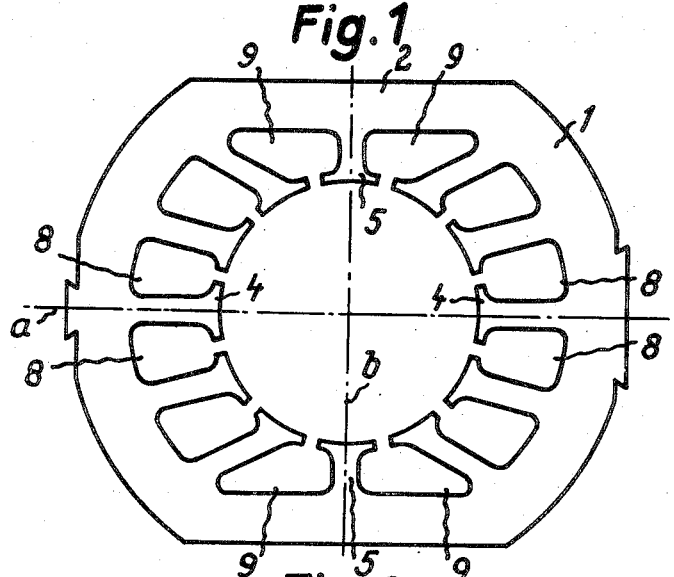
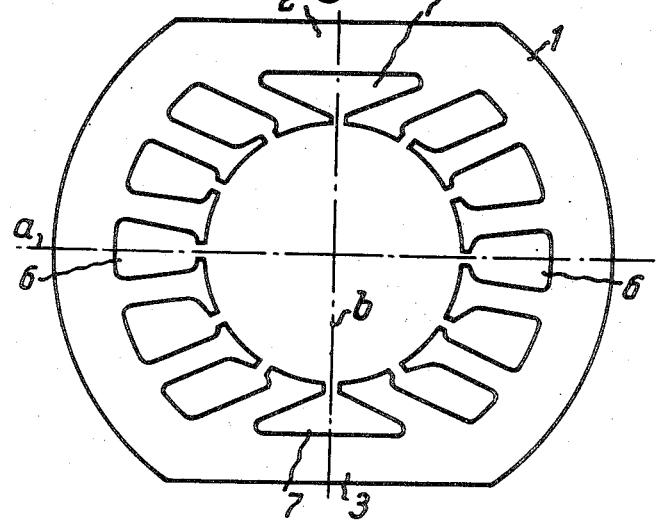
Inventor:
HANS FLECKENSTEIN
By Toulmin & Toulmin
Attorneys

United States Patent Office 2,830,209
Patented Apr. 8, 1958

2,830,209

LAMINATION FOR STACKS IN ASYNCHRONOUS MACHINES

Hans Fleckenstein, Oldenburg, Germany, assignor to Licentia Patent-Verwaltungs-G. m. b. H., Hamburg, Germany Application January 3, 1956, Serial No. 557,187

Claims priority, application Germany January 3, 1955

4 Claims. (Cl. 310—216)

This invention relates to laminations of novel shape in stacks used for asynchronous machines.

It is an object of my invention to provide laminations for the above stated purpose which are flattened on opposite sides, and wherein the marginal portion in the flattened region is of substantially the same cross section as the non-flattened regions.

It is a further object of my invention to provide laminations of novel shape which are particularly adapted for use in small asynchronous machines.

In direct current machines and universal motors having marked stack poles, it is conventional, particularly for bi-pole machines, to flatten the stack laminations on both sides, partly in order to save sheet material, and partly to reduce the space required. It is also well known to flatten the stack laminations in asynchronous machines. However, in the latter case, the weakening of the cross section of the sheet margin in the flattened regions is of such disadvantage to the magnetic flux conditions in the lamination that little use is made of flattening. However, flattening becomes more important in the use of small asynchronous machines as motors for office machines, into which machines the motors are to be built with the least possible requirement of space.

The above-mentioned objects are achieved, and the aforesaid disadvantages avoided by the laminations shaped according to my invention. My invention consists of deforming the conventional marked recesses or grooves which are uniformly radially arranged about the center of the laminations in such a manner that a substantially uniform cross section of the marginal portion of a lamination flattened on opposite sides is preserved while maintaining the same distribution of grooves about a circular opening, the same cross sectional area of the grooves, and the same width of the tongues or teeth which are left between adjacent grooves. An even rate of power output is maintained by a stack formed of laminations according to my invention, in which the grooves or recesses which are extending substantially along the axis parallel to the flattened regions of the margin, are lengthened, while the grooves extending in the direction of the center axis vertical to the flattened regions of the margin are shortened and widened, and the grooves intermediate both axes are correspondingly deformed, all grooves having substantially the same cross sectional area.

Depending upon the size of the motor, a different number of grooves is provided.

Furthermore, the marked recesses or grooves can be arranged in such a manner that the above-mentioned axes pass through opposite grooves, or in such a manner that they pass through opposite tongues between adjacent grooves. In the first instance, such laminations are better suited for three-phase windings and show an improved adaptation of the field curve to a true sine curve, while in the second instance, the winding costs will be lower. Depending upon whether it is desired to use a three-phase motor, a two-phase motor, or a single-phase motor with auxiliary phase, or if it is desired to obtain a field curve adapted as closely as possible to a sine curve, or if it is desired to reduce the winding costs, one or the other of the above described two embodiments can be chosen.

My invention will be better understood by the following description taken in connection with the accompanying drawings in which:

Fig. 1 shows an embodiment of the lamination according to my invention wherein the axes parallel and vertical to the flattened regions of the lamination margin pass through tongues between adjacent recesses; and Fig. 2 shows another embodiment of the lamination according to my invention wherein the aforesaid axes pass through recesses in the lamination.

In these figures, like reference numerals designate like parts. The marginal portion 1 of the lamination is flattened in the regions 2 and 3.

In the embodiment shown in Fig. 1, the axes $a$ and $b$ pass through tongues 4 and 5, while in the embodiment shown in Fig. 2, the same axes pass through recesses 6 and 7.

As can be seen, the recesses in the vicinity of axis $a$, for instance 6 in Fig. 2 and 8 in Fig. 1, are elongated and narrow; while the recesses in the vicinity of axis $b$, for instance 7 in Fig. 2 and 9 in Fig. 1 are shortened and widened, and all recesses are of substantially the same cross sectional area.

It will be understood that this invention is susceptible to modification in order to adapt it to different usages and conditions, and, accordingly, it is desired to comprehend such modifications within this invention as may fall within the scope of the appended claims.

What is claimed is:

1. A lamination for stacks in asynchronous machines comprising substantially parallel flattened marginal portions on two opposite sides of the lamination, and a plurality of recesses radially arranged about the center of the lamination, said recesses being symmetrically arranged and of substantially the same cross sectional area, adjacent recesses being spaced from each other by substantially the same distances, said recesses being so deformed as to leave a marginal portion around the lamination, which marginal portion is of substantially the same radial diameter.

2. A lamination for stacks in asynchronous machines comprising substantially parallel flattened marginal portions on two opposite sides of the lamination, and a plurality of recesses radially arranged about the center of the lamination, said recesses being symmetrically arranged and of substantially the same cross sectional area, adjacent recesses being spaced from each other by substantially the same distances, those recesses being disposed substantially parallel to said flattened portions being of elongated narrow shape and those recesses being disposed substantially vertical to said flattened portions being shortened and widened, said recesses being so deformed as to leave a marginal portion around the lamination, which marginal portion is of substantially the same radial diameter.

3. A lamination for stacks in asynchronous machines comprising substantially parallel flattened marginal portions on two opposite sides of the lamination, and a plurality of recesses radially arranged about the center of the lamination, said recesses being symmetrically arranged and of substantially the same cross sectional area, adjacent recesses being spaced from each other by substantially the same distances, said recesses being so symmetrically arranged in said lamination that the central axis parallel to said flattened marginal portions, as well as the central axis vertical to the flattened marginal portions pass through tongues of the lamination left between adjacent recesses, said recesses being so deformed as to leave a marginal portion around the lamination, which marginal portion is of substantially the same radial diameter.

4. A lamination for stacks in asynchronous machines comprising substantially parallel flattened marginal portions on two opposite sides of the lamination, and a plurality of recesses radially arranged about the center of the lamination, said recesses being symmetrically arranged and of substantially the same cross sectional area, adjacent recesses being spaced from each other by substantially the same distances, said recesses being so symmetrically arranged in said lamination that the central axis parallel to said flattened marginal portions, as well as the central axis vertical thereto pass through opposite recesses, said recesses being so deformed as to leave a marginal portion around the lamination, which marginal portion is of substantially the same radial diameter.

References Cited in the file of this patent
UNITED STATES PATENTS

| | | |
|---|---|---|
| 1,173,089 | Bergman | Feb. 22, 1916 |
| 1,326,340 | Hellmund | Dec. 30, 1919 |
| 2,267,414 | Morrill | Dec. 23, 1941 |
| 2,461,296 | Ordas | Feb. 8, 1949 |
| 2,506,637 | Fog | May 9, 1950 |